United States Patent [19]

Watanabe et al.

[11] Patent Number: 4,633,273
[45] Date of Patent: Dec. 30, 1986

[54] INFORMATION RECORDING MEDIUM INCLUDING ANTIMONY-SELENIUM COMPOUNDS

[75] Inventors: Kenjiro Watanabe, Tokyo; Susumu Sakamoto, Chiba; Junichi Akamatsu, Saitama, all of Japan

[73] Assignee: Sony Corporation, Tokyo, Japan

[21] Appl. No.: 693,037

[22] Filed: Jan. 22, 1985

[30] Foreign Application Priority Data

Jan. 26, 1984 [JP] Japan .................. 59-12431

[51] Int. Cl.$^4$ .................. G01D 9/00; G01D 15/10
[52] U.S. Cl. .................. 346/135.1; 346/1.1; 346/76 L
[58] Field of Search .................. 346/1.1, 135.1, 76 L

[56] References Cited

U.S. PATENT DOCUMENTS 4,400,707 8/1983 Mitsuya .................. 346/135.1
4,499,178 2/1985 Wada .................. 346/135.1

*Primary Examiner*—E. A. Goldberg
*Assistant Examiner*—Mark Reinhart
*Attorney, Agent, or Firm*—Hill, Van Santen, Steadman & Simpson

[57] ABSTRACT

An information recording medium wherein the recording layer consists of a thin film of a SbSe compound containing 58-85 atomic % Sb, with the balance Se. This material has been found to facilitate transformation from the crystalline state to the amorphous state or from the amorphous state to the crystalline state by means of laser ray irradiation, thereby rendering recording and erasing of information more practical.

8 Claims, 6 Drawing Figures

INFORMATION RECORDING MEDIUM INCLUDING ANTIMONY-SELENIUM COMPOUNDS

BACKGROUND OF THE INVENTION

1. Field of the Invention

The present invention is in the field of recording media for recording information optically as by means of laser rays, and relates more specifically to an erasable recording medium composed of a specific SbSe compound. The invention also has to do with a method of using the recording medium.

2. Description of the Prior Art

Photomagnetic material such as TbFe or GdCo is known as an erasable optical recording material. In an information recording medium using such photomagnetic material, however, the recording information, i.e., the direction of magnetization, must be read using light polarization, making the optical system quite complex. Moreover, since the erasing is performed by an external magnetic field, the apparatus becomes complicated.

There has also been a method proposed where reversible phase transition from an amorphous state to a crystalline state or from the crystalline state to the amorphous state is utilized. The phase transformation from the crystalline state to the amorphous state is performed by rapid heating and rapid cooling so as to record the information. The phase transition from the amorphous state to the crystalline state is performed slowly so as to carry out erasing. Signal reproduction is performed utilizing the variation of reflectivity R and transmitivity $\tau$ in the amorphous state and the crystalline state. In this method, since the phase transition in the crystalline state to and from the amorphous state is performed by laser light of different quantity and irradiation time so as to perform the recording and erasing, the method is more advantageous in that the optical system is simplified. In such recording method utilizing a phase transition, since the reproduction signal quantity is quite large compared to that produced by photomagnetic material as above described, this method is also advantageous in that recording with a large contrast ratio is possible.

Materials containing Se or low-grade oxides of Te are known for use as such recording materials evidencing phase transition. Among these materials, $Sb_2Se_3$ evidences a phase transition from its amorphous state to the crystalline state at about 170° C. and therefore the information recording medium utilizing reversibility in the crystalline to and from the amorphous state of this material is possible. The recording material consisting of $Sb_2Se_3$ can be transferred from its amorphous state to its crystalline state by irradiation by a laser beam locally heating this portion to 170° C. or more. Since the transition from the amorphous state to the crystalline state must be performed by holding the temperature to 170° C. or more for a certain period of time, slow heating conditions utilizing the laser ray are necessary. Transition from the amorphous state to the crystalline state is performed by increasing the quantity of irradiation from the laser ray and heating the material to a melting temperature of about 600° C. In this case, rapid cooling is necessary for the transition to the amorphous state. To summarize, the transition from the amorphous state to the crystalline state is performed by slow heating and slow cooling while the transition from the crystalline state to the amorphous state is performed by rapid cooling so as to erase and record the information.

In actual practice, however, the transition from the crystalline state to the amorphous state may not be completely effective in such recording material. This is because even if a portion of the material in the crystalline state is melted by irradiation of the laser ray, it is recrystallized in the cooling process.

SUMMARY OF THE INVENTION

In order to eliminate the above-mentioned disadvantages, the present invention provides an information recording medium wherein the transition to amorphous state or crystalline state can be reliably effected by means of a laser ray such as a semiconductor ray.

In a recording medium according to the present invention, utilizing an SbSe compound, a thin film of the compound provides a recording layer in an amorphous state and is applied onto a substrate. It is then heated entirely or only along a recording track portion by selective heating by means of laser ray irradiation or the like into its crystallized form. Then the crystalline state is transferred into the amorphous state by local heating using a semiconductor laser ray typically having a wavelength of 830 nm. The modulated laser ray thereby forms an optical information bit. This bit can be erased, for example, by irradiating along the recording track with the laser ray so that the amorphous part is recrystallized. In the transition from amorphous state to crystalline state, the heating temperature T is higher than the crystallizing temperature $T_x$ of the recording layer material and lower than its melting temperature $T_M$. The following relationship therefore applies:

$$T_x < T < T_M.$$

If the time in which the material is held to the temperature T under these conditions is represented by $t_a$, the time $t_a$ must be longer than the time required for crystallization. That is, the following condition applies:

$$t_a > t_o \qquad (1)$$

On the other hand, the transition from crystalline state to amorphous state is effected by heating to a temperature higher than the melting temperature $T_M$ and cooling. If the time required for cooling from the melting temperature $T_M$ to the crystallizing temperature $T_x$ is represented by $t_b$, the time $t_b$ must be shorter than the time $t_o$ required for crystallization. In other words, the following relationship obtains:

$$t_o > t_b \qquad (2)$$

Consequently, in order to secure both transitions in the amorphous state to and from the crystalline state, the following relationship is required:

$$t_a > t_o > t_b \qquad (3)$$

The invention provides an information recording medium wherein the above relationship (3) can be achieved easily and securely, and transition of the recording layer in the crystalline state to and from the amorphous state, i.e., for recording and erasing of information, can be effected easily.

BRIEF DESCRIPTION OF THE DRAWINGS

A further explanation of the present invention will be made in conjunction with the attached sheets of drawings in which.

DESCRIPTION OF THE PREFERRED EMBODIMENTS

The present invention provides a thin film recording layer composed of SbSe containing Sb in an amount of 58-85 atomic % and preferably including Sb in an amount of 68-77 atomic %. The information is applied to this recording medium in the form of a thin film by light irradiation.

The amount of Sb in the 58-85 atomic %, and preferably 68-77 atomic % version, arose because if the Sb content is less than 68 atomic %, and particularly less than 58 atomic %, the time $t_o$ required for crystallization is so long that the condition set forth in equation (1) cannot be satisfied and the transition from amorphous state to crystalline state cannot be produced. On the other hand, if the Sb content is more than 77 atomic % and particularly more than 85 atomic %, the crystallizing time $t_o$ becomes so short that although the conditions of formula (1) can be easily satisfied, the conditions of aforementioned formula (2) cannot be satisfied even if the transition from crystalline state to amorphous state is intended, since the recrystallization resists returning to its amorphous state.

Moreover, if the Sb content becomes excessive, crystal separation of a part of the Sb is produced at the thin film forming state and further the diameters of crystal particles produced by heating using laser ray irradiation become large. This presents no problem if the laser beam diameter is 50-60 microns, but noise may be produced at the signal reproduction state if the laser beam diameter is about 1 micron.

Figure 1:
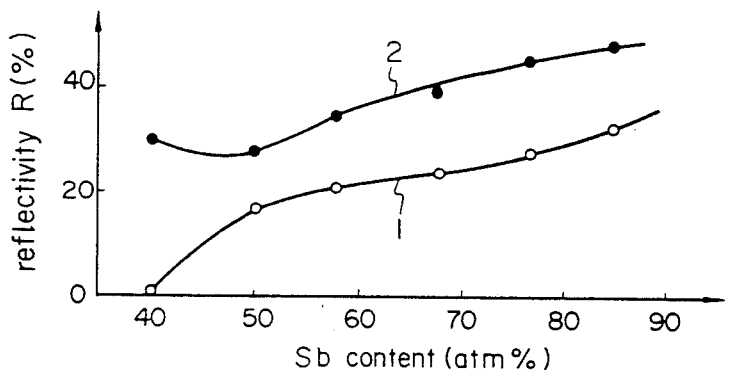
FIG. 1 is a curve plotting reflectivity against Sb content in the SbSe compounds in the amorphous state and in the crystalline state.

Describing the drawings more specifically, FIG. 1 shows the results obtained when a thin film recording layer of SbSe compound having a thickness of 800-1100 Å is evaporated on a transparent acrylic substrate and further an acrylic plate is disposed on the thin film recording layer. The Sb content in the recording layer is varied between specimens and the reflectivity R of the specimens was measured when the SbSe recording layer was in the amorphous state and when the layer was heated and cooled slowly into crystallization. In FIG. 1, curve (1) illustrates the reflectivity R obtained in the amorphous state and curve (2) shows the reflectivity in the crystalline state. It can be clearly seen from both curves that when the Sb content is varied, there is a difference of reflectivity R between the amorphous state and the crystalline state and that it can become large.

Figure 2:
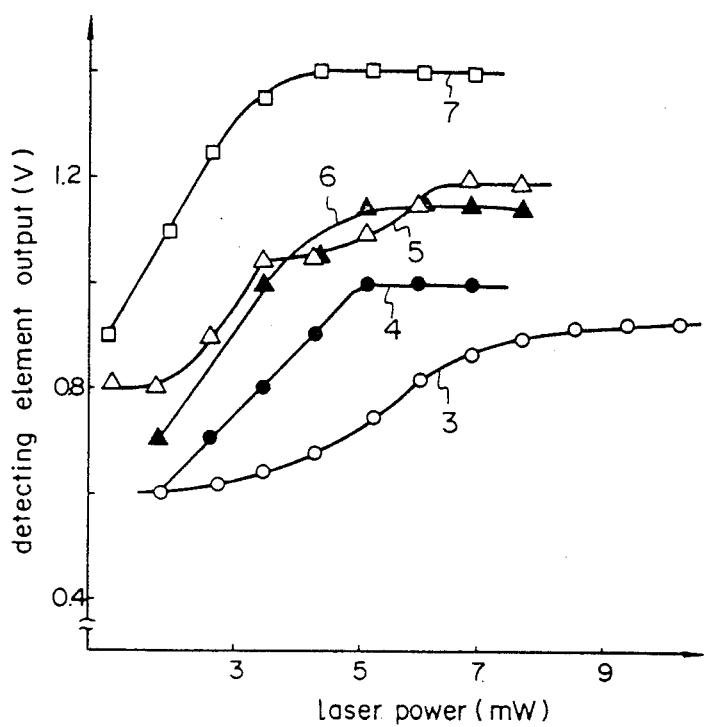
FIGS. 2 and 3 are curves illustrating plots of detecting element output versus reflectivity for various compositions.

FIG. 2 shows the results obtained where various disks having SbSe thin film recording layers in their amorphous state but differing in compositions were prepared and rotated at rotational speeds of 300 rpm, with a laser beam being irradiated onto each disk using varying amounts of laser power and then reflectivity with respect to a semiconductor laser ray was measured by means of reproduction output of the light detecting element. In FIG. 2, curve (3) shows the results obtained using $Sb_{68}Se_{32}$, curve (4) used $Sb_{71}Se_{29}$, curve (5) used $Sb_{73}Se_{27}$, curve (6) used $Sb_{77}Se_{23}$, and curve (7) employed $Sb_{81}Se_{19}$. It can be clearly seen from these curves that as the Sb content becomes large, the transition from amorphous state to crystalline state with large variation of reflectivity is obtained at low power levels.

Figure 3:
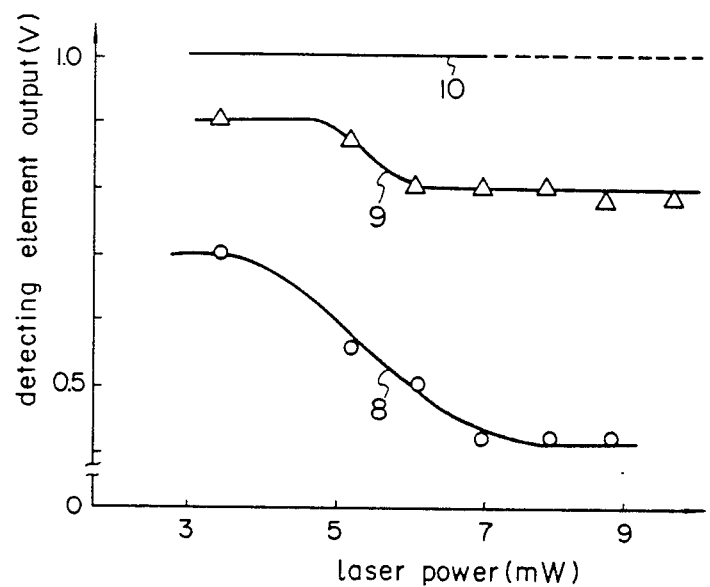
Figure 5:
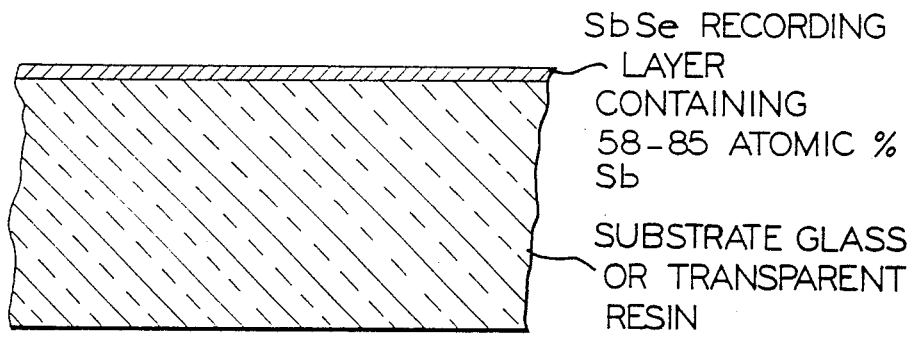
FIG. 5 is a greatly enlarged cross-sectional view of the simplest form of the present invention.

FIG. 3 shows the results obtained when a thin film of SbSe compound with different composition ratios was evaporated on a glass substrate and then heated and cooled slowly into complete crystallization. A cross-sectional view of the structure appears as FIG. 5. Each specimen had a thin film recording layer treated in such a manner in the form of a disk which was rotated at a rotational speed of 300 rpm. A semiconductor laser ray was irradiated onto the disk when the laser power on the disk surface was varied. Then, the reflectivity of the irradiated part with respect to the semiconductor laser was measured by means of reproduction power of the light detecting element. In FIG. 3, curve (8) shows the results obtained using a thin film recording layer of $Sb_{58}Se_{42}$, and curve (9) employed $Sb_{68}Se_{32}$. Curve (10) shows that the compound $Sb_{81}Se_{19}$ represents a condition where the recording layer is so deformed that variation of optical properties, i.e., variation of reflectivity, cannot be detected. It will be understood from these curves that the smaller the Sb content, the more the reflectivity variation which exists by the transition from crystalline state to amorphous state.

It can be clearly seen from FIGS. 2 and 3 that, in the case of an SbSe compound recording layer, reversible transition between the amorphous state and the crystalline state can be performed readily at certain ranges of Sb content. Although a disk rotation speed of 300 rpm was used in making these measurements, if it is raised to 1800 rpm, for example, the cooling time $t_b$ can be substantially decreased. This is because when the laser transferring speed is rapid the heat storage effect is decreased and the cooling rate becomes rapid. In fact, transition of $Sb_{81}Se_{19}$ from the crystalline state to the amorphous state is difficult at 300 rpm but is possible at 1800 rpm. In other words, even if the film crystallizing time $t_o$ is the same, the above-mentioned relationship shown in formula (1) can be satisfied by varying the disk rotation speed.

In the other situation, the disk rotation speed may be decreased for the transition from the amorphous state to the crystalline state, or when the reversible transition in amorphous state to and from crystalline state is performed at the same disk rotation speed, the beam spot of the irradiating laser ray may be made in elliptical form only at the transition from the amorphous state to the crystalline state, whereby the time $t_a$ can be substantially increased and the condition specified in formula (2) can be satisfied. From the foregoing, it is concluded that the Sb content to satisfy the above-mentioned equation (3) should be 58-85 atomic %.

EXAMPLE

Figure 6:
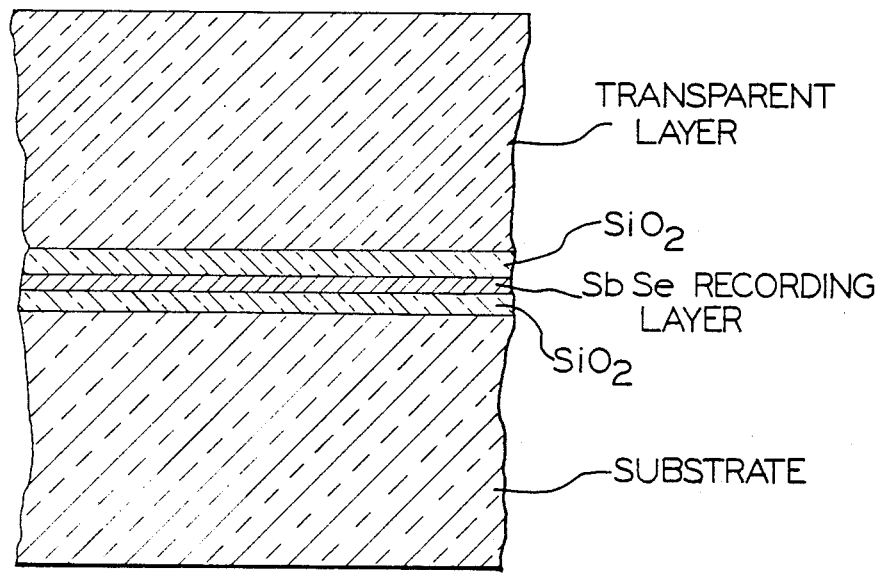
FIG. 6 is a greatly enlarged cross-sectional view showing a modified form of the invention, both FIGS. 5 and 6 being exaggerated for purposes of clarity.

On an acrylic substrate having a thickness of 1.2 mm there was a guide groove molded by injection molding. A film of $SiO_2$ having a thickness of 1500 Å was evaporated into the groove by electron beam evaporation. A thin film recording layer of $Sb_{70}Se_{30}$ film was formed on the $SiO_2$ film. The SbSe thin film recording layer was formed to a thickness of about 900 Å using both an $Sb_2Se_3$ evaporation source and an Sb evaporation source and controlling the evaporation rate of both sources to provide co-evaporation. Then, on the $Sb_{70}Se_{30}$ thin film recording layer there was further evaporated an $SiO_2$ film to a thickness of 1200 Å, and an acrylic plate having a thickness of 1.2 mm was closely contacted with the $SiO_2$ film and cured using an ultraviolet setting resin. The resulting structure is shown in FIG. 6. The purpose of forming the $SiO_2$ films with the interposition of the thin film recording layer is that when the laser ray is focused and irradiated on the thin film recording layer and local heat is effected, the acrylic substrate is prevented from thermal deformation and irreversible reaction by thermal deformation is avoided. A semiconductor laser ray was irradiated onto the disk of a diameter of 200 mm produced in such a manner from the side of the substrate and erasing of the record was performed.

First, a part of the thin film recording layer formed in amorphous state and to be made part of a recording track was crystallized at a disk rotation speed of 450 rpm. The power of the semiconductor laser on the disk surface was 11 mW. Next, the track crystallized in this manner was transferred from the crystalline state to the amorphous state at a disk rotation speed of 1800 rpm. A laser power modulation frequency of 2 MHz was used to perform the recording. The peak power was 15 mW on the disk surface. A good optical recording bit was formed. The same track was crystallized again at 450 rpm and the signal erasing was confirmed. The power of the semiconductor laser was 11 mW on the disk surface as in the previous crystallization.

Figure 4:
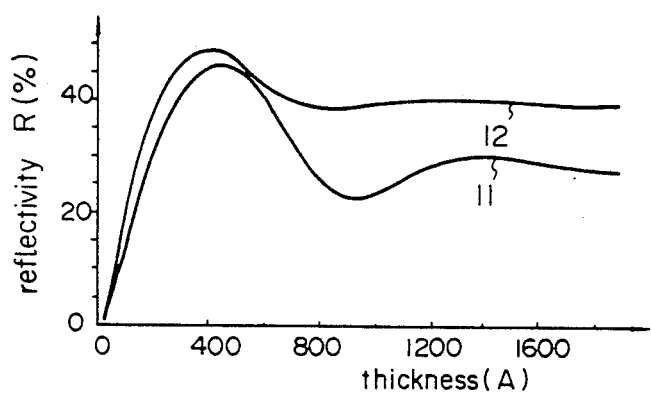
FIG. 4 is a curve plotting the relationship between reflectivity and the film thickness of the SbSe compound.

FIG. 4 shows the results obtained when the film thickness of a thin film recording layer of $Sb_{68}Se_{32}$ formed on a glass substrate was varied. Curve 11 in FIG. 4 shows the reflectivity R of the thin film recording layer in the originally formed amorphous state with respect to the semiconductor laser ray. Curve 12 illustrates the reflectivity R of the recording layer in the crystalline state created by heating and slow cooling. It will be seen from FIG. 4 that if the thickness of the recording layer is made 850 Å or more, even at a single layer, there is a large variation of the reflectivity obtained between the amorphous state and the crystalline state irrespective of the film thickness. In this case, the complex refractive index $\hat{n}$ in the amorphous state is $\hat{n} = 4.4 - i\,1.5$, and $\hat{n}$ in the crystalline state is $\hat{n} = 4.9 - i2.8$.

Although the foregoing description relates mainly to recording in the crystalline state to the amorphous state and erasing in the amorphous state to the crystalline state, the recording and the erasing may be just the reverse. The invention can also be applied not only to a rotating disk but also to a card form.

In accordance with the invention described, the Sb content in a recording layer of SbSe is made 58–85 atomic % and preferably 68–77 atomic %. At these levels, transition in changing from crystalline state to and from the amorphous state can be performed well, and large variations in optical properties, i.e., reflectivity, are obtained in a single layer structure. Since the recording medium lends itself to excellent recording and erasing properties, it can be used advantageously for a video disk or an audio disk.

It should be evident that various modifications can be made to the described embodiments without departing from the scope of the present invention.

We claim as our invention:

1. An optical information recording medium comprising a substrate, a thin film information recording layer formed on said substrate, said film being composed of an SbSe compound containing from 58–85 atomic % Sb, said layer being reversibly changeable between a crystalline phase and an amorphous phase to thereby record information by the difference in optical characteristics between said crystalline phase and said amorphous phase.

2. A recording medium according to claim 1 wherein said compound contains 68–77 atomic % Sb.

3. A recording medium according to claim 1 wherein a layer of $SiO_2$ is interposed between said substrate and said compound.

4. A recording medium according to claim 1 wherein said recording layer is at least about 800°–1100° Å in thickness.

5. A method for recording intelligence which comprises providing a recording medium having a film recording layer composed of an SbSe compound containing from 58–85 atomic % Sb, heating said layer by means of a laser ray until said compound crystallizes, and transforming the crystallized material into the amorphous state by heating with a laser ray modulated in accordance with the intelligence to be recorded thereby producing an optical information bit.

6. A method according to claim 5 wherein said film recording layer is rotated at a lower speed during crystallization than when recording at the amorphous state.

7. A method according to claim 6 which includes the step of erasing the recording by reverting said layer to the crystallized state.

8. A method according to claim 5 wherein the time of heating to the crystallization state is greater than the time required for crystallization, and the material is heated above the melting temperature and cooled to the crystallization temperature in a shorter time than required for crystallization.

* * * * *